July 23, 1940.                J. UNERTL                 2,208,913
                    MOUNTING FOR TELESCOPE GUN SIGHT
                         Filed March 30, 1940
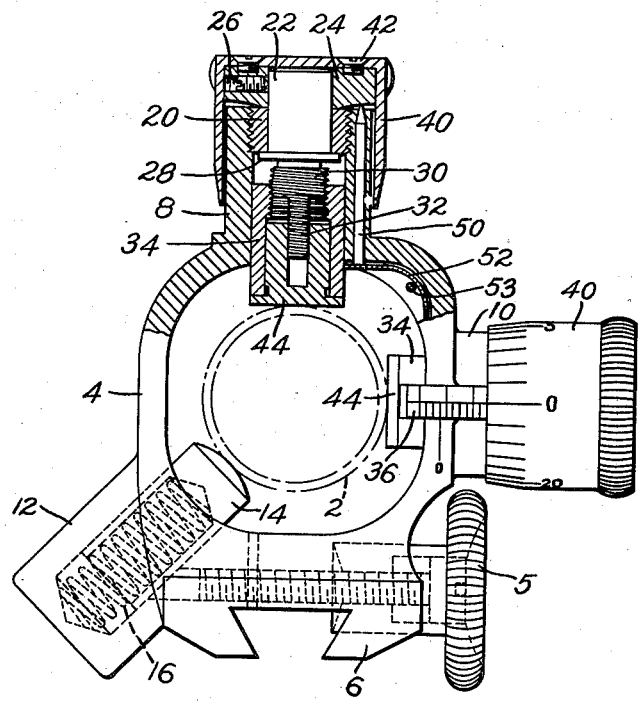
WITNESS
INVENTOR
John Unertl.
ATTORNEY Patented July 23, 1940

2,208,913

UNITED STATES PATENT OFFICE 2,208,913

MOUNTING FOR TELESCOPE GUN SIGHT

John Unertl, Pittsburgh, Pa.

Application March 30, 1940, Serial No. 327,009

7 Claims. (Cl. 33—50)

My invention relates to telescopes and more particularly to an improved means for adjustably mounting a telescopic gun sight.

In the past a number of expedients have been tried in an attempt to arrive at a telescope mounting which is simple in construction but sufficiently rugged to permit the required fine and consistent adjustment of the telescope, and to compensate for variations in windage and elevation, without altering such adjustment or damaging the telescope itself under conditions of shock and vibration incident to the use of high-velocity cartridges in the gun upon which the telescope is mounted.

Usually the telescope adjustment is made at a point adjacent to the breech of the gun and the telescope is movable bodily by calibrated screws in vertical and horizontal directions, respectively. An example of the general type of mounting here under consideration, is disclosed in U. S. Patent No. 1,770,451, issued July 15, 1930 to Baker. The Baker mounting, however, does not meet all modern requirements. It does not, for example, provide an adjusting means capable of positive and reproducible adjustment of the telescope in spite of normal wear on the moving parts of the adjusting means, and the portion of the adjusting means in contact with the telescope barrel is of such limited area that the barrel frequently becomes dented and marred in normal use of the gun upon which it is mounted. Another example is U. S. Patent No. 2,143,167 issued January 10, 1939 to R. Pechar. Here the adjusting devices do not bear directly upon the telescope barrel but engage in slots cut in a separate ring loosely fitting the barrel. This results in a somewhat, insecure mount for the telescope, and the parts of the adjusting means are not designed to insure permanence of adjustment during normal use thereof.

It is an object of the present invention, therefore, to provide an adjustable mounting for a gun sight telescope which is substantially simpler than those of commensurate ruggedness used theretofore, and which is substantially more accurate and reproducible in adjustment than those heretofore obtainable.

Other objects will be apparent from the following description and the appended claims, with reference to the accompany drawing wherein the single figure is an elevation view, partially in vertical section, of a telescope mounting embodying the invention.

Referring to the drawing, a gun sight telescope barrel is indicated in dotted lines at 2, and is adjustably supported, as described below, in a frame 4, preferably metallic, provided at its base 6 with one portion of a dovetail key-way for slidably receiving a correspondingly shaped keybar secured to the gun barrel upon which the telescope is to be mounted, and a knurled knob 5 may be operated to clamp the frame in a desired position with respect to the gun barrel. The specific mounting of the frame need not be described in detail since any desired mounting may be resorted to such as is indicated in the aforesaid patents to Baker and Pechar, for example.

The frame 4 includes two hollow bosses 8 and 10 spaced 90° apart with reference to the axis of the telescope 2, and a third boss 12 on an opposite side of the frame spaced 135° from each of the bosses 8 and 10. Accordingly, adjusting means acting along the axes of the bosses 8 and 10 will move the telescope 2 vertically and horizontally, respectively, and such movement may be resiliently opposed by a plunger 14 engaging the telescope barrel and backed by a helical spring 16 in the boss 12, in accordance with usual practice.

The adjusting devices in the bosses 8 and 10 each includes an insert 20 threaded into the upper end of the boss to be stationary with respect thereto and having a central bore for rotatably receiving an actuating shaft 22 which extends through such bore. A disc 24 is secured to one end of the shaft 22, as by a set-screw 26, and a shoulder 28 is formed on the shaft to bear against the opposite side of the insert 20. The insert 20 is disposed between the disc 24 and the shoulder 28 with sufficient tightness to minimize lost motion between these parts without interfering with relatively easy rotation of the shaft 22 in the journal afforded by the bore of insert 20.

The inner end of the shaft 22 is threaded at 30 and is provided with a flat extension 32 along the edges of which the threads 30 are continued.

The adjusting head comprises a cylinder 34 having internal threads at its inner upper end for engagement with the threads 30 on shaft 22 and extension 32. Also the head includes, as shown more clearly in connection with the boss 10, a key or rib 36, formed preferably integrally therewith, which extends through a key-way or slot formed in the body of frame 4. Accordingly, when the shaft 22 is turned, the head will be moved into or out of the bore of the boss 8. It should be noted that when the head has moved sufficiently to ride off the threads 30 on the shaft, it will continue to move toward the axis of the telescope by reason of the threads on the flat extension 32, thus providing an increased range of adjustment.

The shaft 22 is manually rotated by a cap 40 having a circular portion overlying the disc 24 and secured thereto as by screws 42, and a depending cylindrical skirt embracing the outside of the boss 8. As indicated in connection with the boss 10, the skirt portion may be inscribed in degrees of rotation and cooperate with similar indicia on the key or rib 36, as a micrometer. The head 34 is closed at its inner end by a plug 44 having a bifurcated inner portion for receiving the flat extension 32, and an outer circular face for direct engagement with the barrel of the telescope 2. As the head moves toward or away from the telescope, the plug 44 is moved with it, but it rotates with rotation of the shaft 22 by reason of its engagement with the flat extension 32.

In devices of this type, it is usual to provide a "click" device to indicate audibly the extent of turning of the cap 40. In the present embodiment this comprises a pin 50 extending through a bore in the boss 8 parallel to the axis of the screw shaft 22. The lower end of the pin 50 is engaged by a flat spring 52 which urges the pin into engagement with the under face of disc 24 which is radially slotted, as indicated. As the cap 40 is turned, a series of "clicks" will be made corresponding in number to the extent of the turning movement, and hence to the extent of movement of the telescope.

The adjusting device for the boss 10, to move the telescope horizontally, is substantially the same as that described above with reference to the boss 8. The pin of the "click" device for the operating cap 40 extends parallel to the bore of the boss 10 and is urged toward the cap 40 by the other end of spring 52 which is retained in a recess formed in the body 4 by a pin 53 at about the midpoint of the spring.

Referring in detail again to the adjuster of boss 8, it will be noted that the pin 50 and spring 52 afford not only a rugged and positive click device, but also exert a positive and substantially constant pressure against the lower face of the disc member 24 which, being rigid with the shaft 22, insures that any lost motion between such shaft and the insert 20 is continuously taken up and compensates for wear of the moving parts.

Also it will be noted that as the operating cap 40 is turned to advance or retract the operating head 34, the cap itself does not move axially, but remains relatively fixed with reference to the body 4 and boss 8 (or 10). The linear scale on the rib 36 moves with the operating head 34, with which it is preferably integral, and cooperates with the edge of the skirt of cap 40 to effect the micrometer indication of the advance of the head 34.

The plugs 44 on the operating heads 34 have faces of substantial diameter, to distribute as widely as practicable the stresses imposed on the telescope barrel 2 resulting from the shock of normal operation of the fire-arm upon which the assembly is mounted. Further, the plugs are rotatable during adjustment of the operating heads 34 (which do not rotate) resulting in a wiping action on the surface of the scope barrel.

It should be apparent from the foregoing that the structure here described is an efficient and simple telescope adjustment embodying features conducive to greater accuracy of adjustment and an increased reproducibility of adjustment. Quite obviously the particular form here illustrated is only by way of example and it is intended that the scope of the invention shall be limited only by the appended claims.

I claim as my invention:

1. In an adjustable telescope mount, a body portion having an aperture therethrough larger than the external diameter of a cylindrical telescope to be supported by the body, an adjusting means extending through a side of said body for engagement with such telescope comprising an adjusting shaft and means for rotatably mounting it to extend radially of said telescope and for restraining it against movement radially of said telescope, a manually rotatable cap secured to said shaft to cause the rotation thereof, an operating head threaded on the other end of said shaft and means in said body portion for restraining said head against rotation.

2. In an adjustable telescope mount, a body portion having an aperture therethrough larger than the external diameter of a cylindrical telescope to be supported by the body, an adjusting means extending through a side of said body for engagement with such telescope comprising an adjusting shaft and means for rotatably mounting it to extend radially of said telescope and for restraining it against movement radially of said telescope, a manually rotatable cap secured to said shaft to cause the rotation thereof, an operating head threaded on the other end of said shaft and means in said body portion for restraining said head against rotation, and a telescope-engaging plug at the end of said operating head having lateral dimensions at least as great as the end of said operating head.

3. In an adjustable telescope mount, a body portion having an aperture therethrough larger than the external diameter of a cylindrical telescope to be supported by the body, an adjusting means extending through a side of said body for engagement with such telescope comprising an adjusting shaft and means for rotatably mounting it to extend radially of said telescope and for restraining it against movement radially of said telescope, a manually rotatable cap secured to said shaft to cause the rotation thereof, an operating head threaded on the other end of said shaft and means in said body portion for restraining said head against rotation axially of said shaft, and a telescope-engaging plug at the end of said operating head having lateral dimensions at least as great as the end of said operating head, and interengaging means on said plug and shaft for rotating said plug in accordance with the rotation of said shaft.

4. In an adjustable telescope mount, a body portion having an aperture therethrough larger than the external diameter of a cylindrical telescope to be supported by the body, an adjusting means extending through a side of said body for engagement with such telescope comprising an adjusting shaft and means for rotatably mounting it to extend radially of said telescope and for restraining it against movement radially of said telescope, a manually rotatable cap secured to said shaft to cause the rotation thereof, an operating head threaded on the other end of said shaft and means in said body portion for restraining said head against rotation, said restraining means including means for indicating the extent of movement of said operating head with respect to said body portion.

5. In an adjustable telescope mount, a body portion having an aperture therethrough larger than the external diameter of a cylindrical telescope to be supported by the body, an adjusting means extending through a side of said body for engagement with such telescope comprising an adjusting shaft and means for rotatably mounting it to extend radially of said telescope and for restraining it against movement radially of said telescope, a manually rotatable cap secured to said shaft to cause the rotation thereof, an operating head threaded on the other end of said shaft and means in said body portion for restraining said head against rotation with said shaft, said restraining means including means for indicating the extent of movement of said operating head with respect to said body portion and circumferential indicae on said rotatable cap for co-operation with said indicating means to afford a micrometer adjustment of the extent of movement of said operating head.

6. In an adjustable telescope mount, a body portion having an aperture therethrough larger than the external diameter of a cylindrical telescope to be supported by the body, an adjusting means extending through a side of said body for engagement with such telescope comprising an adjusting shaft and means for rotatably mounting it to extend radially of said telescope and for restraining it against movement radially of said telescope, a manually rotatable cap secured to said shaft to cause the rotation thereof, an operating head threaded on the other end of said shaft and means in said body portion for restraining said head against rotation with said shaft, a click device comprising a milled lower face on said rotatable cap, a pin extending axially of said adjusting shaft having one end for engagement with said milled face and resilient means at the other end thereof for biasing it into such engagement.

7. In an adjustable telescope mount, a body portion having an aperture therethrough larger than the external diameter of a cylindrical telescope to be supported by the body, an adjusting means extending through a side of said body for engagement with such telescope comprising an adjusting shaft and means for rotatably mounting it to extend radially of said telescope and for restraining it against movement radially of said telescope, a manually rotatable cap secured to said shaft to cause the rotation thereof, an operating head threaded on the other end of said shaft and means in said body portion for restraining said head against rotation with said shaft, a second such adjusting means extending through said body and displaced from the first mentioned adjusting means by 90° radially of said telescope, a click device for each of said adjusting means each comprising a pin mounted to slide parallel to its corresponding rotatable cap, and means for urging both said pins into engagement with the respective notched surfaces comprising a resilient strip retained between its ends in said body portion and bearing at each end against one of said pins to bias them to slide toward and into contact with said notched surface, respectively.

JOHN UNERTL.